United States Patent
Cohen et al.

(10) Patent No.: US 10,445,181 B2
(45) Date of Patent: Oct. 15, 2019

(54) LOSSLESS SYNCHRONIZATION SOFTWARE RESET

(71) Applicant: Western Digital Technologies, Inc., San Jose, CA (US)

(72) Inventors: Inon Cohen, Oranit (IL); Asaf Gueta, Or Yehuda (IL)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 74 days.

(21) Appl. No.: 15/790,368

(22) Filed: Oct. 23, 2017

(65) Prior Publication Data
US 2019/0121699 A1 Apr. 25, 2019

(51) Int. Cl.
*G06F 11/00* (2006.01)
*G06F 11/14* (2006.01)

(52) U.S. Cl.
CPC .... *G06F 11/1438* (2013.01); *G06F 2201/805* (2013.01)

(58) Field of Classification Search
CPC ............. G06F 11/1438; G06F 11/1402; G06F 11/1446; G06F 11/1448; G06F 11/1458
USPC .......................................................... 714/15
See application file for complete search history.

(56) References Cited

U.S. PATENT DOCUMENTS

| | | | |
|---|---|---|---|
| 6,859,856 B2 | 2/2005 | Piau et al. | |
| 7,917,697 B2 | 3/2011 | McAvoy et al. | |
| 8,140,813 B2 | 3/2012 | Ozceri et al. | |
| 8,176,230 B2 | 5/2012 | Chen et al. | |
| 8,296,467 B2 | 10/2012 | Lee et al. | |
| 2008/0148136 A1* | 6/2008 | Bae | H04L 1/1874 714/799 |
| 2009/0172246 A1 | 7/2009 | Afriat | |
| 2010/0268897 A1 | 10/2010 | Okamoto et al. | |
| 2011/0041039 A1 | 2/2011 | Harari et al. | |
| 2014/0359354 A1* | 12/2014 | Havemose | G06F 11/1438 714/15 |
| 2017/0024451 A1* | 1/2017 | Sullivan | G06F 16/273 |
| 2017/0090948 A1 | 3/2017 | Waidhofer et al. | |
| 2017/0249432 A1* | 8/2017 | Grantcharov | H04L 63/0272 |

OTHER PUBLICATIONS

Silicon Storage Technology, Inc.; Serial Quad I/O (SQI) Flash Memory; SST26VF016 / SST26VF032; dated 2011; 39 total pages.
Micron Technology, Inc.; Technical Note; Reset Configurations for MT25Q, MT25T, and N25Q Flash Memory Devices; dated 2013; 5 total pages.

* cited by examiner

*Primary Examiner* — Sarai E Butler
(74) *Attorney, Agent, or Firm* — Patterson & Sheridan, LLP; Steven H. Versteeg

(57) ABSTRACT

A method to perform a lossless synchronization software reset is disclosed including provisions for monitoring an arrangement for occurrence of a software reset condition; saving at least one arrangement parameter in a memory in the arrangement; performing at least one software reset on the arrangement; performing a device mount procedure; reading the at least one arrangement parameter in the memory and initializing at least one component according to the at least one arrangement parameter saved in the memory.

21 Claims, 2 Drawing Sheets

LOSSLESS SYNCHRONIZATION SOFTWARE RESET

FIELD OF THE DISCLOSURE

Aspects of the disclosure relate to computer storage. More specifically, aspects of the disclosure relate to lossless synchronization of computer components during a software reset.

BACKGROUND INFORMATION

Computer storage needs have grown for computer applications over the years. As time has progressed, computer manufacturers have become more efficient in production of computers. Attention is placed not only on the hardware used within a computer or connected to a computer, but also the software upon which a computer connected device operates.

Software is designed to control the various hardware components to provide a user with stability of operation and flexibility of purpose. While the software controls the various hardware components, often times there is a need to provide for a reset of either the hardware or the software to ensure that proper computer activities are achieved.

Resets of computer functions, either software or hardware based, allow the computer to enter known states so that processing may proceed as intended. Resets can be either automatic functions or may be elected by a user. Computer generated automatic resets, while having a potential positive effect on the overall computing experience, are often symptoms of greater problems in the systems themselves. In addition to the problems associated with the systems themselves, such resets can hamper operations and slow computing down to unacceptable levels. Computer architects, therefore, desire to minimize such resets to occur as minimally as possible. Different techniques are used to minimize these resets, including spinlocks, semaphores and barriers.

Software resets occur at times needed for stability and operability purposes. During these software resets, the computer that is monitoring the activities of the connected devices may lose contact with the connected devices. Once the connected devices are not attached to the computer, the devices must be resynchronized to allow the connected device and the computer to achieve required functionality. Computer operations are significantly slowed when resynchronization is required, impacting the overall efficiency of the computer.

There is a further need to allow a computer to identify an initiation of a software reset of a device connected to a computer.

There is need to provide a more time efficient manner upon which a computer and a device connected to a computer may be synchronized.

There is a further need to provide for a method and apparatus to achieve a synchronization of a computer device in a lossless manner.

SUMMARY

So that the manner in which the above recited features of the present disclosure can be understood in detail, a more particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

In first non-limiting embodiment, a method configured to perform a lossless synchronization software reset is described comprising: monitoring an arrangement for occurrence of a software reset condition; saving at least one arrangement parameter in a memory in the arrangement; performing at least one software reset on the arrangement; performing a device mount procedure, reading the at least one arrangement parameter in the memory and initializing at least one component according to the at least one arrangement parameter saved in the memory.

In another non-limiting embodiment, an arrangement to perform a lossless synchronization software reset is disclosed comprising: means for monitoring an arrangement for occurrence of a software reset condition, means for saving at least one arrangement parameter in a memory in the arrangement, means for performing at least one software reset on the arrangement, means for performing a device mount procedure, means for reading the at least one arrangement parameter in the memory and means for initializing at least one component according to the at least one arrangement parameter saved in the memory.

In another non-limiting embodiment, a method to perform a lossless synchronization software reset, is disclosed having monitoring an arrangement for occurrence of a software reset condition, saving at least one arrangement parameter in a memory in the arrangement, performing at least one software reset on the arrangement, performing a device mount procedure, monitoring the arrangement to determine if a software reset has occurred within a given threshold, finishing a normal device initialization ready for a host command when an internal software reset has not occurred, reading the at least one arrangement parameter in the memory when the internal software reset has occurred within a given threshold and initializing at least one component according to the at least one arrangement parameter saved in the memory when at least one software reset has occurred within a given threshold.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
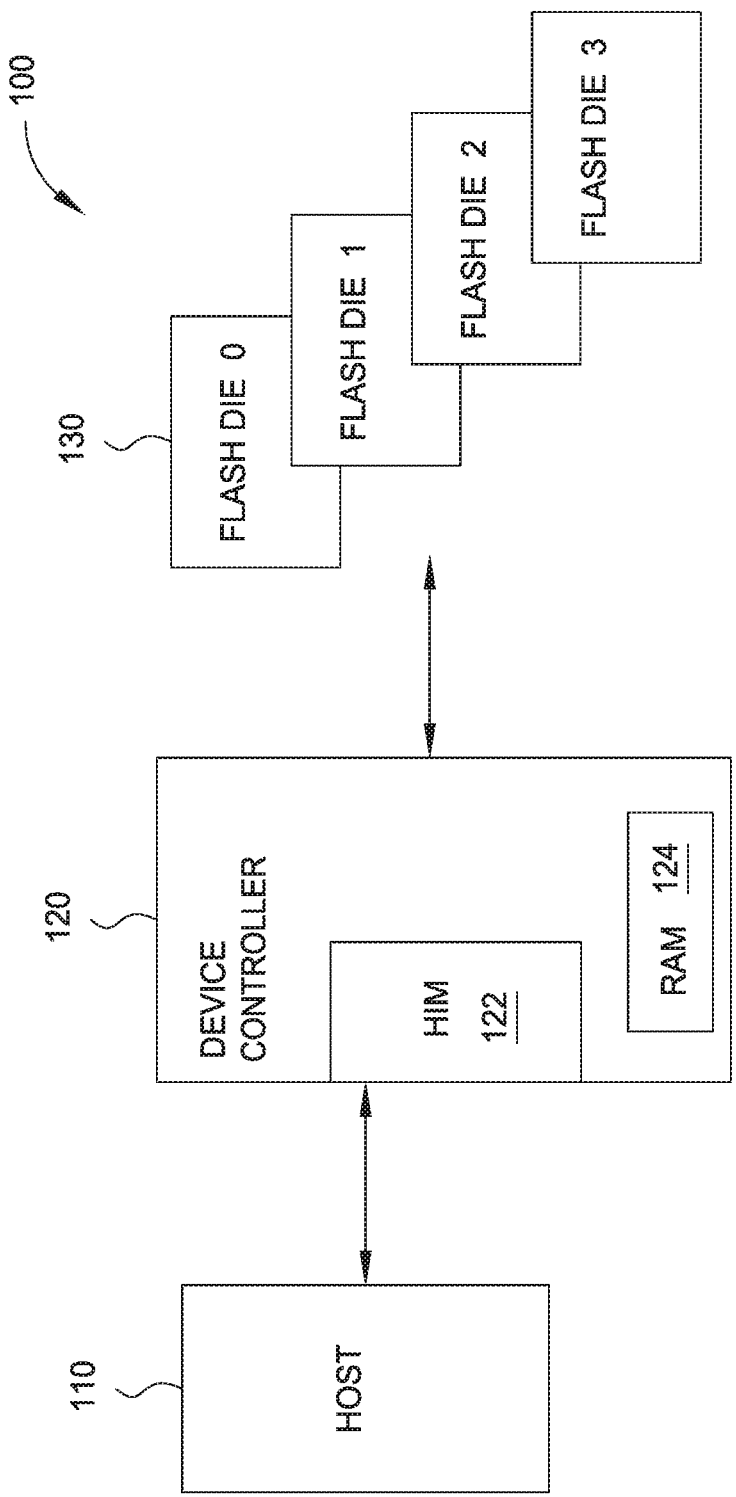
FIG. 1 is a block diagram of a host and device controller to store updated configuration parameters.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects of the present disclosure relate to computer operations and computer storage. In the aspects provided, computer system architecture is discussed that may be used for lossless synchronization during software resets. More specific discussions of computer system architecture and methods to perform software resets are then discussed.

In the embodiments described, a data storage arrangement is connected to a host system, such as a personal computer or a server. The function of the data storage arrangement is to accept and store data until the data is needed by a user or the host. The data storage arrangement may have to accept large bursts of data at a rapid pace, depending on the computer processes performed, therefore the data storage arrangement is configured with multiple memory units that provide for various states of usage.

Certain sections of the data storage arrangement may be configured of memory systems that provide for fast action (low latency) so that computer processes may be conducted at a rapid pace. Such low latency action may be accomplished by single layer cell memory configurations. If bulk amounts of data are required to be stored, multiple layer cell memory configurations are also present, such as triple level cell memory configurations. The data storage arrangement may have an interface that allows the data storage arrangement to connect with the host and allow for synchronization of the host and the data storage arrangement. The interface may be a SATA compatible interface, as a non-limiting embodiment. The memory storage may have a configuration to allow for plug and play ability. Although described as having a SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection.

Auxiliary connections may be provided to the data storage arrangement to allow for addition options for inputting data directly to the data storage arrangement without interfacing with a host. Such direct input of data may be provided through placement of an integrated secure digital card to offload or copy data. Other auxiliary connections may be provided for additional input/output operations. Such connections may be USB 2.0, USB 3.0, Firewire or other hard wired configurations. Gigabit Ethernet interfaces and connections may also be used.

The data storage arrangement may be configured with a separate power supply or may be run through other power supply means, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. Such battery indicators may be, for example, low energy consumption light emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

A controller is provided to control actions of the data storage arrangement as required by the host. The controller may also be configured to perform maintenance activities for the data storage arrangement to allow for efficient use.

Internal software may be provided on the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, stereo audio system. The internal software may also be provided such that the access of data may be performed by cloud applications designed for interface with the data storage arrangement.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

The internal software may also be capable of providing diagnostic support for users. In such configurations, two different modes may be provided. A quick test software program may be provided with the capability to check the data storage arrangement for major performance problems. A full test mode may also be provided to provide detailed status information to a user. Such status information may be, for example, total amount of memory of the data storage arrangement, the amount of memory storage used, storage divisions provided on the data storage arrangement, firmware versions for the internal software, memory block errors and similar data. The internal software may also have the capability of accepting data to update the firmware of the internal software.

The internal software may also be used as a server system wherein in certain embodiments, DLNA enabled software is incorporated. Such software allows for quick file transfer and error checked operation as a server. In some embodiments, the internal software may be provided with the capability to use file transfer protocol (FTP) to enable the transfer of content to and from the memory storage in public access folders. The data storage arrangement may also provide for either a secured log in or an anonymous login capability.

In specific embodiments, the data storage arrangement may be configured such that the system interacts with cloud storage systems. In the event that the data storage arrangement approaches the limits of storage capability, the data storage arrangement may allow for some of the data to be stored on cloud based systems. Selection of the data to be stored on such external storage systems may be governed by the controller which is configured to determine what sections of data may be appropriately stored in cloud based systems to minimize latency for users. The storage system may have a unique identifier MAC address and device name to allow the system to operate on an independent basis. The storage system may also be operated in a configuration that allows for the system to clone a MAC address of a computer that is attached.

The overall capacity of the data storage arrangement may be vary according to the different embodiments provided. Capacities 1 TB, 2 TB up to 12 TB may be provided, as non-limiting embodiments. Different form factors may also be provided. In the illustrated embodiment, a form factor of 3.5 inches is provided. Compatibility of the data storage arrangement may be provided for Windows operating systems, Windows Server, Linux and Mac OS, as non-limiting embodiments. Example Windows operating systems that may use the system may be Windows 10, Windows 8 and Windows 7. Example Mac OS systems may be Lion (Mac OSA 10.7), Mountain Lion (Mac OS 10.8), Yosemite (Mac OS 10.10), El Capitan (Mac OS 10.11), Sierra and Mavericks as non-limiting embodiments. Supported browsers for the storage system may be, in non-limiting embodiments, Internet Explorer, Safari, Firebox and Google Chrome.

Software may also be included in the system to allow for quick and automatic backups of data according to user prescribed requirements. Such backup ability may be compliant with Windows based backup and restore functions and/or Apple Time Machine requirements. Furthermore, software may be provided to add more than one user to the storage system. Users can be added or deleted according to an administration account. Such administration account may also allow for restricted access for certain users according to administration requirements.

In the illustrated embodiments, the minimization of synchronization is sought for the components of the system. Proper synchronization in the sending and receiving of data prevents a condition called "deadlock" where different components of a system are awaiting instructions that are never delivered. As a result, the deadlock condition does not allow a user the ability to recover data that may not be saved within a specific memory system. The result is that data is lost that has not been saved in a non-volatile medium. Synchronization, therefore, ensures that the detrimental effects of deadlock do not occur and the processing continues to occur. If synchronization is lost with a component, for example a disk drive, it is desired to achieve synchronization between the disk drive and a host without interrupting calculations occurring within the host. Arrangements and method for performing synchronization without losses in data are described below.

Referring to FIG. 1, a configuration of an arrangement 100 is provided wherein a host 110 is connected to a device controller 120. The connection between the host 110 and the device controller 120 is a wired connection that is provided through an interface 122. The (host interface module) interface 122 is also provided with a connection to random access memory (RAM) 124 that is present in the device controller 120.

The device controller 120 is connected to a series of flash dies 130. In the illustrated embodiment, there are four (4) flash dies, namely flash die 0, flash die 1, flash die 2 and flash die 3. Each of the individual flash dies 130 are configured to interact with a section of flash memory. Different types of flash memory may be used, including NAND flash units. The illustrated arrangement 100 provided in FIG. 1, is configured to provide for lossless synchronization software resets when operating methods provided, for example, in FIG. 2. Additionally, it is to be understood that additional (or less) flash dies may be present as the four example flash dies are for exemplification purposes only.

Figure 2:
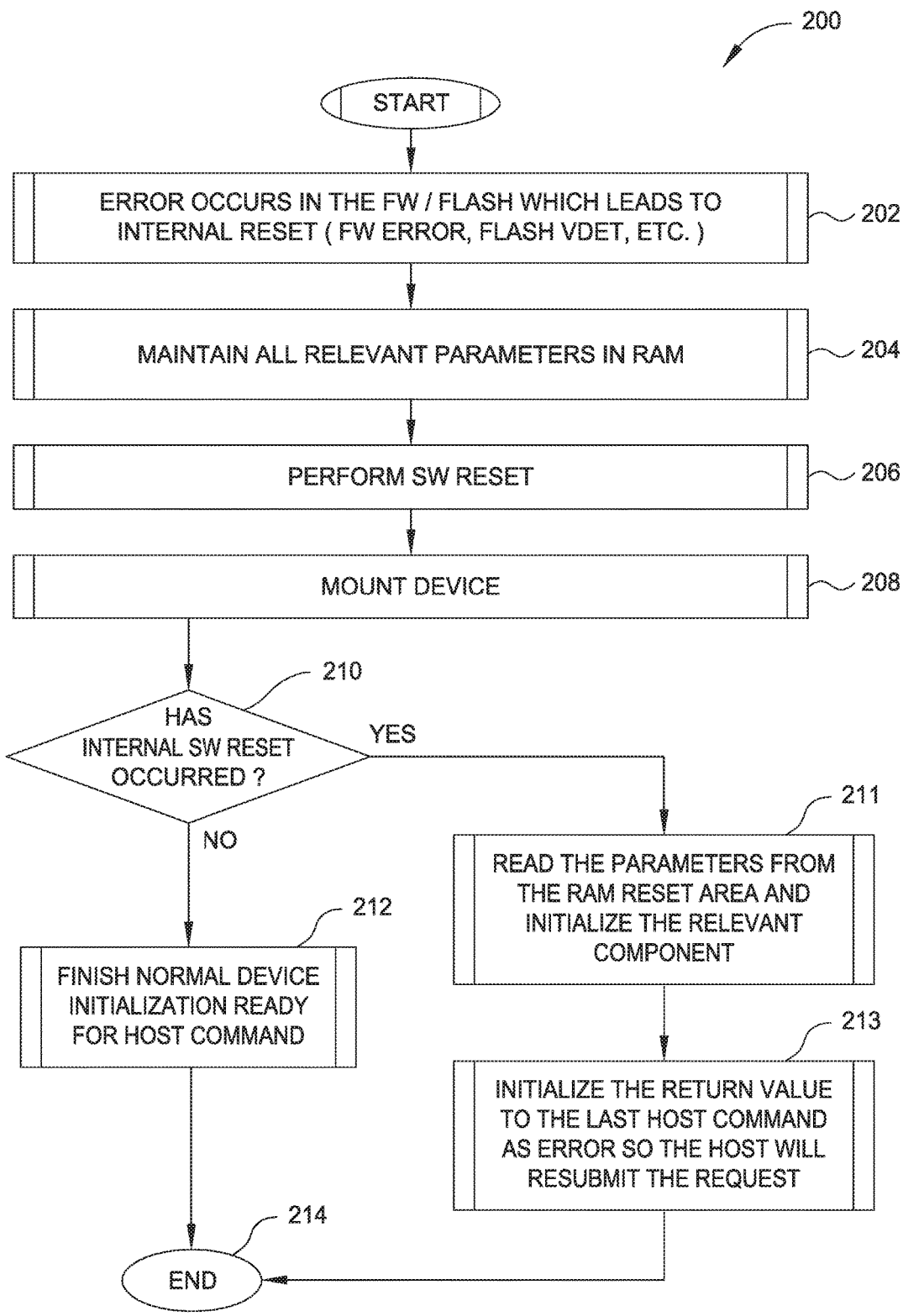
FIG. 2 is a flow chart to for components in a host and device relationship to store updated configuration parameters.

Referring to FIG. 2 a method 200 for lossless synchronization software resets is illustrated. At 202, an error occurs in the firmware/flash that leads to an internal reset. In this non-limiting embodiment, other errors may occur requiring an internal reset. In a non-limiting embodiment, the error may be a password error, a Flash voltage detection error or similar error. At 204, before performing a software reset, all relevant parameters are stored in RAM. The RAM is not cleared during the software reset. As a non-limiting embodiment, the parameters may be stored in a non-volatile random access memory in either a storage device or a computer. At 206, a software reset function is performed. At 208 a device mount function is performed, such as a loading/booting program initiation when a device is connected. At 210, a query is run to determine if an internal software reset has occurred. Extra parameters may be added to this query. A threshold may be added to the query to provide a timeframe for the software reset occurrence. The threshold may be, for example, within a timeframe of 1 minute. Such a threshold would rule out software resets that occurred in the far past from effecting the current configuration and processing. If an internal software reset did not occur at 210, then a normal device initialization may occur at 212 as the device is ready for a host command. The method may then end at 214.

If an internal software reset has occurred, then, at 211, the parameters are read from the RAM reset area and the relevant components are initialized. The method then proceeds to 213 wherein a return value is initialized to the last host command as when the error occurred so that the host will resubmit the request.

In one non-limiting embodiment, a method to perform a lossless synchronization software reset is disclosed comprising monitoring an arrangement for occurrence of a software reset condition, saving at least one arrangement parameter in a memory in the arrangement, performing at least one software reset on the arrangement, performing a device mount procedure, reading the at least one arrangement parameter in the memory and initializing at least one component according to the at least one arrangement parameter saved in the memory.

In another non-limiting embodiment, the method may further comprise initializing a return value to a last host command as error requiring a host to resubmit a request.

In another non-limiting embodiment, the method may further comprise determining if the at least one software reset has occurred.

In another non-limiting embodiment, the method may further comprise finishing a normal device initialization ready for host command.

In another non-limiting embodiment, the method may be performed wherein the monitoring an arrangement for occurrence of a software reset condition includes monitoring a firmware and a flash memory for an error requiring the software reset condition.

In another non-limiting embodiment, the method may be accomplished wherein the arrangement is an embedded multimedia card storage device.

In another non-limiting embodiment, the method may be accomplished wherein the arrangement is a uniform flash storage.

In another non-limiting embodiment, the method may be accomplished wherein the arrangement is a PCI express expansion bus arrangement.

In another non-limiting embodiment, the method may be accomplished wherein the initializing the at least one component according to the at least one arrangement parameter saved in the random access memory occurs without resetting a host.

In another non-limiting embodiment, the method may be accomplished wherein the host is at least one of a personal computer, a server, a video playback apparatus, an audio playback apparatus and a cellular telephone device.

In another non-limiting embodiment, the method may be accomplished wherein the memory is a non-volatile memory.

In another non-limiting embodiment, the method may be accomplished wherein the memory is a random access memory.

In another non-limiting embodiment, the method may be accomplished wherein the at least one component is a data storage device.

In another non-limiting embodiment, an arrangement to perform a lossless synchronization software reset is disclosed comprising means for monitoring an arrangement for occurrence of a software reset condition, means for saving at least one arrangement parameter in a memory in the arrangement, means for performing at least one software reset on the arrangement, means for performing a device mount procedure, means for reading the at least one arrangement parameter in the memory and means for initializing at least one component according to the at least one arrangement parameter saved in the memory.

A method to perform a lossless synchronization software reset, comprising: monitoring an arrangement for occurrence of a software reset condition, saving at least one arrangement parameter in a memory in the arrangement; performing at least one software reset on the arrangement, performing a device mount procedure, monitoring the arrangement to determine if a software reset has occurred within a given threshold, finishing a normal device initialization ready for a host command when an internal software reset has not occurred, reading the at least one arrangement parameter in the memory when the internal software reset has occurred within a given threshold; and initializing at least one component according to the at least one arrangement parameter saved in the memory when at least one software reset has occurred within a given threshold.

In another non-limiting embodiment, the method may be accomplished wherein the arrangement is an embedded multimedia card storage device.

In another non-limiting embodiment, the method may be accomplished wherein the arrangement is a uniform flash storage.

In another non-limiting embodiment, the method may be accomplished wherein the initializing the at least one component according to the at least one arrangement parameter saved in the random access memory occurs without resetting a host.

In another non-limiting embodiment, the method may be accomplished wherein the host is at least one of a personal computer, a server, a video playback apparatus, an audio playback apparatus and a cellular telephone device.

In another non-limiting embodiment, the method may be accomplished wherein the at least one component is a data storage device.

In another non-limiting embodiment, the method may be accomplished wherein the arrangement is one of a disk drive, a hybrid disk drive and a solid state storage device.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. A method to perform a lossless synchronization software reset, comprising:
   monitoring an arrangement for occurrence of a software reset condition;
   saving at least one arrangement parameter in a memory in the arrangement;
   performing at least one software reset on the arrangement;
   performing a device mount procedure;
   reading the at least one arrangement parameter in the memory; and
   initializing at least one component according to the at least one arrangement parameter saved in the memory.

2. The method according to claim 1, further comprising:
   initializing a return value to a last host command as error requiring a host to resubmit a request.

3. The method according to claim 1, further comprising:
   determining if the at least one software reset has occurred.

4. The method according to claim 3, further comprising:
   finishing a normal device initialization ready for host command.

5. The method according to claim 1, wherein the monitoring an arrangement for occurrence of a software reset condition includes monitoring a firmware and a flash memory for an error requiring the software reset condition.

6. The method according to claim 1, wherein the arrangement is an embedded multimedia card storage device.

7. The method according to claim 1, wherein the arrangement is a uniform flash storage.

8. The method according to claim 1, wherein the arrangement is a PCI express expansion bus arrangement.

9. The method according to claim 1, wherein the initializing the at least one component according to the at least one arrangement parameter saved in a random access memory occurs without resetting a host.

10. The method according to claim 9, wherein the host is at least one of a personal computer, a server, a video playback apparatus, an audio playback apparatus and a cellular telephone device.

11. The method according to claim 1, wherein the memory is a non-volatile memory.

12. The method according to claim 1, wherein the memory is a random access memory.

13. The method according to claim 1, wherein the at least one component is a data storage device.

14. The method according to claim 1, wherein the arrangement is one of a disk drive, a hybrid disk drive and a solid state storage device.

15. A method to perform a lossless synchronization software reset, comprising:
   monitoring an arrangement for occurrence of a software reset condition;

saving at least one arrangement parameter in a memory in the arrangement;
performing at least one software reset on the arrangement;
performing a device mount procedure;
monitoring the arrangement to determine if a software reset has occurred within a given threshold;
finishing a normal device initialization ready for a host command when an internal software reset has not occurred;
reading the at least one arrangement parameter in the memory when the internal software reset has occurred within a given threshold; and
initializing at least one component according to the at least one arrangement parameter saved in the memory when at least one software reset has occurred within a given threshold.

16. The method according to claim 15, wherein the arrangement is an embedded multimedia card storage device.

17. The method according to claim 15, wherein the arrangement is a uniform flash storage.

18. The method according to claim 15, wherein the initializing the at least one component according to the at least one arrangement parameter saved in a random access memory occurs without resetting a host.

19. The method according to claim 15, wherein the host is at least one of a personal computer, a server, a video playback apparatus, an audio playback apparatus and a cellular telephone device.

20. The method according to claim 15, wherein the at least one component is a data storage device.

21. The method according to claim 15, wherein the arrangement is one of a disk drive, a hybrid disk drive and a solid state storage device.

* * * * *